United States Patent [19]
McWhorter

[11] Patent Number: 5,975,035
[45] Date of Patent: Nov. 2, 1999

[54] ENGINE AIR INDUCTION CIRCUIT

[76] Inventor: Edward M. McWhorter, 6931 Greenbrook Cr., Citrus Heights, Calif. 95621

[21] Appl. No.: 08/949,957

[22] Filed: Oct. 14, 1997

[51] Int. Cl.[6] .................................................... F02B 75/32
[52] U.S. Cl. ........................................ 123/79 R; 123/543
[58] Field of Search .................................... 123/585, 586, 123/587, 588, 559.1, 79 R, 184.4

[56]  References Cited

U.S. PATENT DOCUMENTS

| | | | |
|---|---|---|---|
| 4,418,532 | 12/1983 | Momose et al. | 123/559.1 |
| 5,205,246 | 4/1993 | McWhorter | 123/79 R |
| 5,331,930 | 7/1994 | McWhorter | 123/79 R |
| 5,385,133 | 1/1995 | Ikuta et al. | 123/585 |
| 5,417,195 | 5/1995 | Tachikawa et al. | 123/585 |
| 5,529,031 | 6/1996 | Yoshioka | 123/585 |

*Primary Examiner*—Marguerite McMahon

[57] ABSTRACT

The inventon is an improvement of the air induction circuit for internal combustion reciprocating piston engines which employ regenerative heating for the volatilization of fuels and their admixtures in an injection cup heated by the exhaust stream, and in particular to those types of engine systems which employ exhaust gas ejectors in their intake and exhaust manifolding.

An auxiliary conduit serving as an air balancing circuit is placed in communication with an air plenum which is also in communication with the ejector air charge circuit. The primary object of this improvement is in its facilitation of the control and stabilization of a uniform mixture ratio of air/fuel charge to the engine.

The flow circuit of the auxiliary conduit is controlled by a cam operated poppet valve in synergistic operation with the engines crankshaft and electronically senses and compensates for the displacement of intake air by high volatilization of fuel in the injection cup positioned within the exhaust gas ejector nozzle.

4 Claims, 2 Drawing Sheets

ENGINE AIR INDUCTION CIRCUIT

CROSS REFERENCES

The present invention presents new and useful improvements to the basic exhaust gas ejector designs of my earlier U.S. Pat. Nos. 5,331,930 and 5,205,246.

SUMMARY OF THE INVENTION

The present invention is an auxiliary air conduit which operates synergistically with the primary intake and exhaust manifolding of those types of engine systems which employ gas ejector circuits and comprise as a part of their construction a heated fuel injection cup for the vaporization of fuels. Air flowing in the auxiliary air conduit is varied by controlled changes in the engine air plenum pressure in a manner which compensates for flow fluctuations within the ejector air circuit of the primary manifolding resulting from the displacement of air by the volatization of fuel within the injection cup.

The primary objective of the invention is to provide an auxiliary air conduit to facilitate the control of the engine air/fuel charge mixture ratio during periods of high rates of fuel volatilization within the fuel injection cup.

It is another object of the present invention to provide new and useful improvements in the heating of fuels beyond their normal boiling points in a fuel rich atmosphere of air and fuel to a point below their spontaneous ignition temperature.

It is yet another object of the invention to provide an additional air circuit which will facilitate the combustion process and system control during engine operation in the lean fuel range.

BRIEF DESCRIPTION OF THE DRAWINGS

There are two diagrammatic drawings presented as part of the specification.

DETAILED DESCRIPTION

Figure 1:
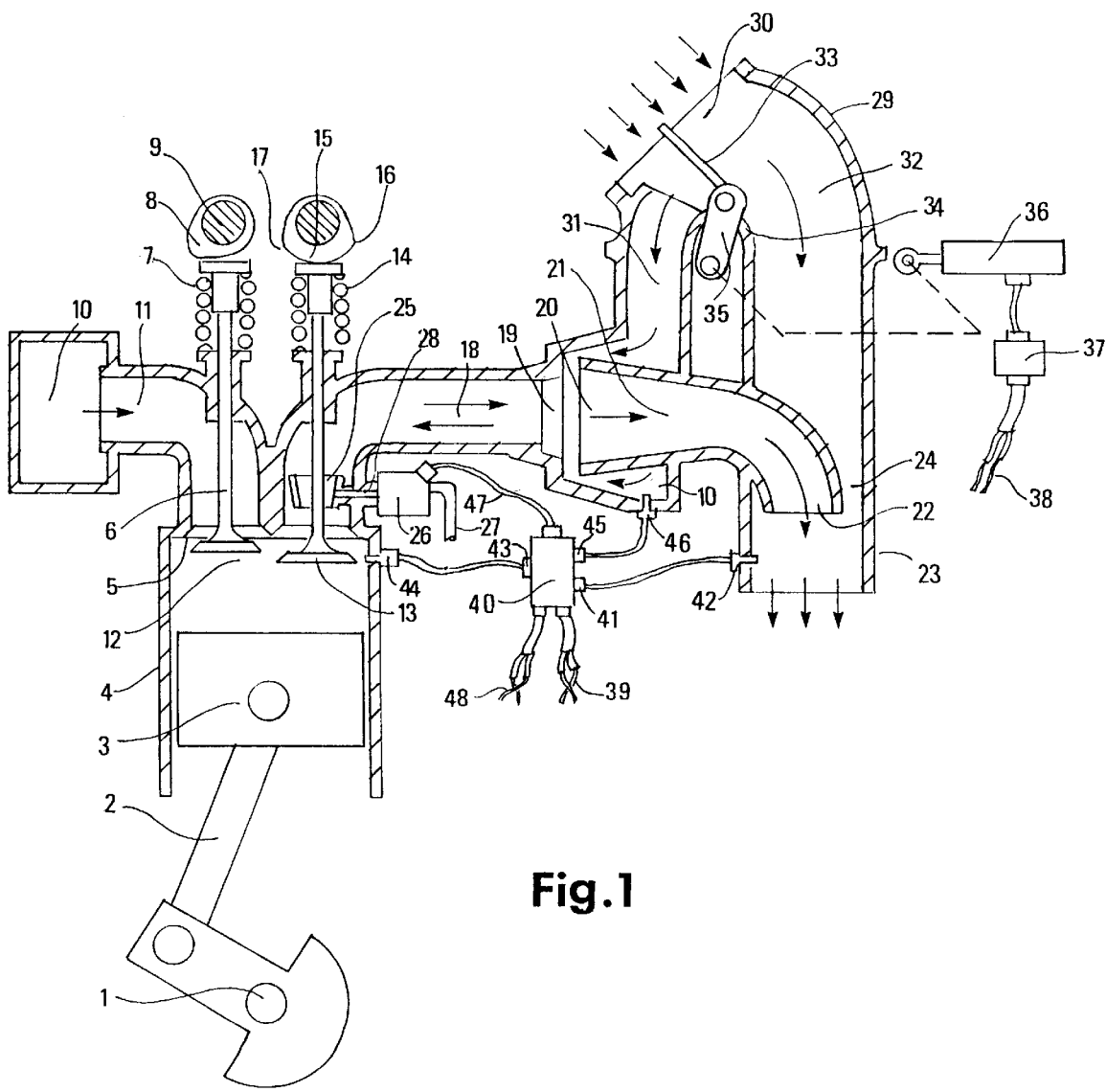
FIG. 1 is a diagram of the engine system principally in cross-section showing the directional flow in each interconnecting conduit of the manifolding.

Referring to FIG. 1 of the drawings which is a diagrammatic cross-section of a reciprocating piston engine comprising crank 1 connecting rod 2 and piston 3 slidably mounted in cylinder 4 which is closed at its upper end by cylinder head 5, all of which is hereinafter referred to as the engine.

Air valve 6 is slidably mounted in cylinder head 5 and is held in the normally closed position against its seat in cylinder head 5 by spring 7 and is opened and closed by cam 8 of camshaft 9 having a plurality of said cams and being rotatively mounted in the said cylinder head 5. Valve 6 controls the flow of air from air plenum 10 passing through conduit 11 to combustion chamber 12 of said engine. Air conduit 10 is composed of a compound configuration and is designated in two places in FIG. 1.

Valve 13 controlling the alternating bidirectional flow of intake and exhaust flow in conduit 18 is slidably mounted in cylinder head 5 and is held in the normally closed position by spring 14 and is actuated to the open position by cam 15. Cam 15 has a broad continuous surface which extends the open valve position between the opening ramp of exhaust lobe 16 and the closing ramp of intake lobe 17. Valve 13 is therefore continuously open one full revolution of crank 1 during the exhaust and intake strokes of piston 3 of said engine.

Exhaust lobe 16 of cam 15 opens valve 13 at the beginning of the piston 3 exhaust stroke permitting exhaust gases from combustion chamber 12 to flow through conduit 18 to nozzle 19 which is in communication with said air plenum 10, which as previously stated is also in communication with conduit 11. The axial center of nozzle 19 is aligned such that its axial flow is directed toward the axial center of inlet 20 of diffuser 21. The said inlet 20 is also in communication with the said air plenum 10. Exhaust flow from nozzle 19 pushes air from air plenum 10, by impact and viscous entrainment, into inlet 20 where its velocity is slowed and its pressure increased by the convergence of the flow channel in diffuser 21. Exhaust gas exits diffuser 21 through outlet 22 and passes into exhaust pipe 23. The said nozzle 19 and said diffuser 21 inlet 20 comprise the fluidic elements of the exhaust gas ejector. The said diffuser 21 outlet 22 and said exhaust pipe 23 comprise the fluidic elements of a jet which pulls air past the annular space 24 between outlet 22 and exhaust pipe 23. In engines having a plurality of cylinder 4 there is likewise a plurality of said defined jets, each of which draft air past annulus 24 of down stream ejector outlets 22 assuring a constant unidirectional flow of air from air plenum 10 through the said diffuser 21 into exhaust pipe 23 within the primary manifolding.

The air in said air plenum 10 is kept free of exhaust gases by said ejector and said jet action. On the subsequent downward stroke of piston 3, during the intake portion of the engine cycle, air is drawn into conduit 18 which is free of exhaust gases as a result of the push-pull force of the said ejector and said jet which keeps the alternate and bidirectional flow of the air and exhaust streams separate during their respective periods of flow in the said conduit 18. Conduit 18 and nozzle 19 are hereinafter referred to as the ejector air circuit during the intake stroke and the ejector exhaust circuit during the exhaust stroke.

Fuel injection cup 25 is fixedly mounted in conduit 18 above the crown of valve 13 and is concentric about its stem. The fuel injection cup is heated during the flow of the ejector exhaust circuit in conduit 18 during the exhaust stroke and is cooled by the ejector air circuit during the intake stroke. The outer surfaces of injection cup 25 are concentric with the inner surfaces of conduit 18 forming an annular outer passage way for alternate air and exhaust flow. The inner surfaces of injection cup 25 are concentric with the stem of valve 13, and these form an inner passage way for alternate air and exhaust flow. Fuel injector 26 delivers fuel from fuel line 27 to fuel injection cup 25 through injection conduit 28. The fuel from injection conduit 28 is fully vaporized in the said inner passage way of fuel injection cup 25 during the intake stroke and mixed with the air flowing in the ejector air circuit flowing in the outer passage way of the said fuel injection cup. The mixture is carried past valve 13 into the combustion chamber by the downward stroke of piston 3.

Air to the engine enters valve body 29 through inlet 30 and this flow is proportionately distributed between air plenum 10 inlet 31 and exhaust pipe 23 inlet 32 by butterfly gate 33 of valve 34 pivotally mounted in said valve body 29. Butterfly gate 33 is rotated about its pivot point by lever arm 35 actuated in this motion by servomechanism actuator 36 which is electronically controlled by controller 37 which responds to electrical signals at input circuit 38 from output circuit 39 of the engine control monitor 40.

Rapid expansion of vaporized fuel in the said inner passageway 28 of injection cup 25 displaces the air flowing into the said ejector air circuit of conduit 18 causing the air/fuel mixture ratio to be shifted toward the fuel rich side of the stoichiometric point and also increases the resistance to air flow in conduit 18 adversely effecting the engine volumetric efficiency. Fluctuation in the air flow in conduit 18 resulting from the volatilization of fuel in injection cup 25 is compensated for by changes in the amount of air permitted to enter air plenum inlet 31 by the engine control monitor 40 increasing the air pressure in air plenum 10 accordingly. The increased air plenum 10 pressure results in higher flow rates through the auxiliary air flow conduit 11 of the present invention offsetting the decrease in air flow rate in conduit 18 resulting from the rapid expansion of fuel in the fuel injection cup 25 of the primary manifolding.

Engine control monitor 40 responds to electrical input signals 41 from sensor 42 which is installed at the exit of exhaust pipe 23 and senses changes in the chemical equilibrium of the exhaust product at the assigned operating air/fuel mixture ratio. Engine monitor 40 also responds to electrical input signal 43 from sensor 44 which senses changes in temperature and pressure in combustion chamber 12 and repositions the butterfly gate 33 which readjusts the pressure in air plenum 10 which in turn effects the balance of the relative amounts of air passing through conduit 11 and in the said ejector air circuit of conduit 18. Engine control monitor 40 will make additional overriding adjustments necessary to assure correct balancing pressure in air plenum 10 by responding to electrical feedback input signals 45 from sensor 46 installed in air plenum 10.

The engine control monitor 40 controls the fuel injection rate to the engine by injector 26 through electrical output circuit 47 responsive to the engine throttle positional electrical input circuit 48 and is coordinated with the controlling parameters described above.

Figure 2:
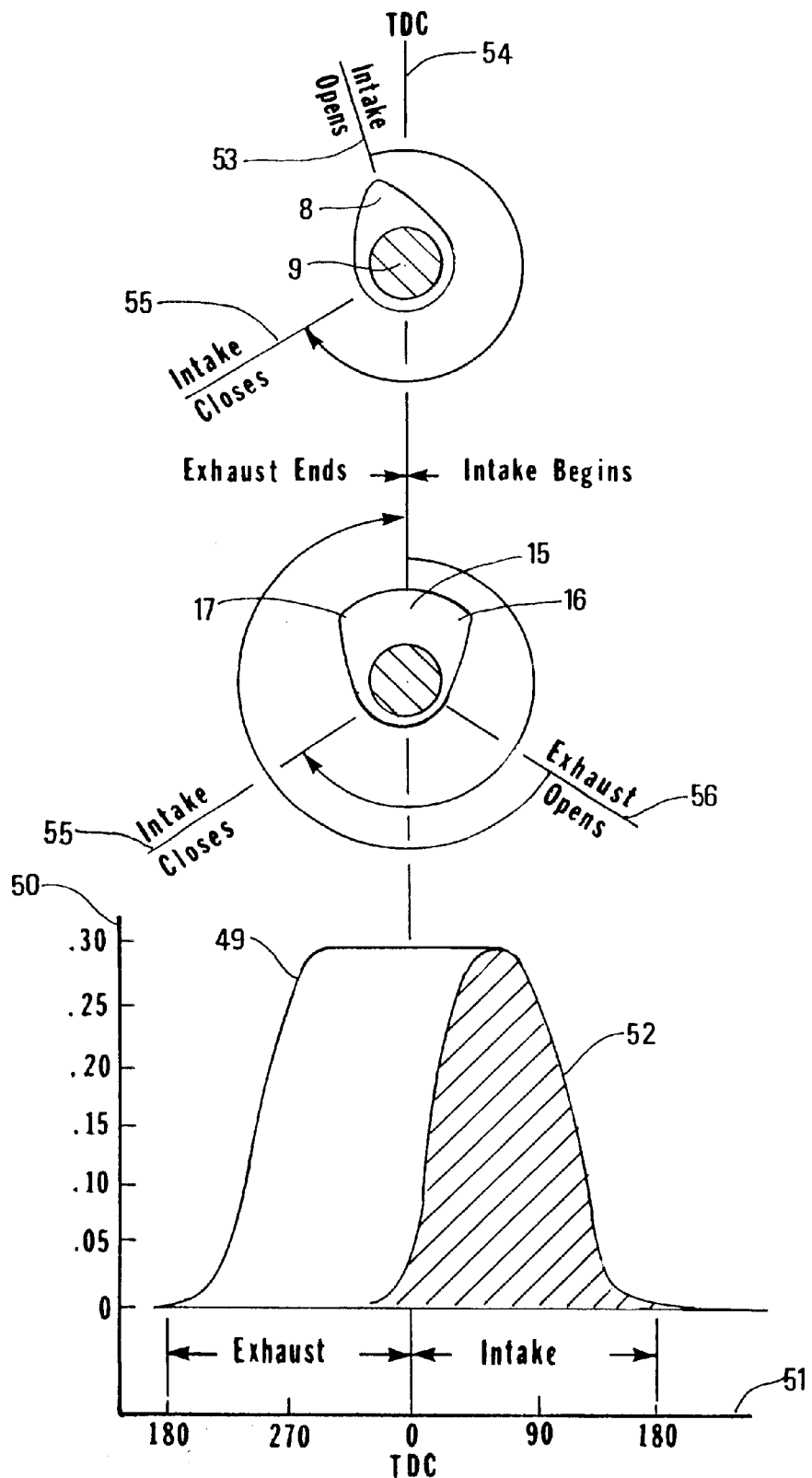
FIG. 2 is a graphical illustration of the engine valve cycles controlling the flow in the auxiliary air conduit and in the exhaust gas ejector nozzle conduit of the engine manifold.

Turning now to FIG. 2 which is a graphical presentation of the coordinated opening and closing traces of valve 6 and valve 13 by cam 8 and cam 15 respectively throughout one complete revolution of crank 1 during the exhaust stroke and subsequent intake stroke of piston 3 of the said engine as shown in FIG. 1.

Trace 49 is a plot of valve 13 lift by double lobe cam 15 from its seat in cylinder head 5 shown as a continuous function of the exhaust and subsequent intake stroke of piston 3 for one complete revolution of crank 1. Valve lift height is given in inches upon the vertical ordinate 50 and the degrees of crank 1 rotation is noted along the horizontal abscissa 51. The combined lobe cam 15 produces trace 49 which is about 75% of the square wave function of both the ejector air and ejector exhaust circuits flowing alternately bidirectional in conduit 18 of FIG. 1. Trace 52 bounding the field of the shaded area of FIG. 2 is a plot of valve 6 lift by cam 8 controlling the flow in auxiliary air conduit 11 of FIG. 1 and is shown superimposed upon the intake portion of trace 49.

Cam 8 opens valve 6 at camshaft 9 rotational position 53 which is in advance of position 54 at the top-dead-center (TDC) of camshaft 9 rotation admitting air into the combustion chamber 12 of said engine of FIG. 1. Cam 8 closes valve 6 at position 55. Valve 13 begins the intake stroke in the fully open TDC position 54 having been opened by exhaust lobe 16 of cam 15 and is closed by intake lobe 17 at the same closing position as valve 6 by cam 8 which is designated in each place as position 55 in FIG. 2. After the engine compression and power strokes of piston 3 are complete exhaust lobe 16 opens at position 56 and remains open until TDC position 54 is reached at which time the intake stroke of the engine begins again.

The invention is an auxiliary air supply circuit comprising valve 6, spring 7, cam 8 of camshaft 9 having a plurality of cams which control air flow from the engine common air supply of air plenum 10 through conduit 11 into combustion chamber 12. The function of said auxiliary air supply is coordinated with the synergistic flow within the primary manifolding of those types of engines which employ exhaust ejector and jet fluidic elements and fuel injection cups in the design of their primary exhaust and intake manifolding circuits.

What is claimed is:

1. An intake and exhaust system of an internal combustion engine having a cylinder head, an air plenum fixedly mounted on said cylinder head, said air plenum having a conduit, flow in said conduit controlled by a valve slidably mounted in said cylinder head and held in the closed position by a spring and actuated to the open position by a cam bringing said air plenum into communication with the combustion chamber of said engine during the intake stroke of the piston of said engine, said air plenum also in communication with a nozzle, said nozzle attached to said conduit, flow in said conduit and said nozzle controlled by said valve slidably mounted in said cylinder head and held in the closed position by a spring and actuated to the open position continuously throughout the exhaust and induction strokes of the piston of said engine by a cam having a broad continuous surface bringing the said air plenum into communication with said combustion chamber of said engine during said exhaust and intake strokes of said engine piston, said nozzle and said conduit comprising the exhaust circuit of an ejector, during upward exhaust stroke of said engine piston, and on the alternate downward stroke of said engine piston during the intake cycle flow passing through said nozzle and said conduit is reversed and said nozzle and said conduit become the intake air circuit of said ejector, said nozzle being axially aligned with the inlet of a diffuser, said inlet of said diffuser in communication with said air plenum and the outlet of said diffuser in communication with an exhaust pipe, said nozzle and said inlet of said diffuser comprising the elements of an ejector, said outlet of said diffuser and said exhaust pipe comprising the elements of a jet, said ejector and said jet work in tandem maintaining flow through said diffuser, a valve body fixedly mounted on said air plenum, said valve body having a pivotally mounted gate, said gate directing air from the inlet of said valve body proportioning said air between the inlet of said air plenum and the inlet of said exhaust pipe, said gate pivotally positioned by an actuator responding to electrical input signals from an engine control monitor, said engine control monitor adjusting air flow proportionally between said inlet of said air plenum and said inlet of said exhaust pipe relative to said engine throttle positional input circuit and fuel injection rate.

2. The engine of claim 1 in which said diffuser outlet in communication with said exhaust pipe extends into said exhaust pipe.

3. An intake and exhaust system of an internal combustion engine having a cylinder head, an air plenum fixedly mounted on said cylinder head, said air plenum having a conduit, flow in said conduit controlled by a valve slidably mounted in said cylinder head and held in the closed position by a spring and actuated to the open position by a cam bringing said air plenum into communication with the combustion chamber of said engine during the intake stroke of the piston of said engine, said air plenum also in communication with a nozzle, said nozzle attached to said conduit, flow in said conduit and said nozzle controlled by said valve slidably mounted in said cylinder head and held in the closed position by a spring and actuated to the open position continuously throughout the exhaust and induction strokes of the piston of said engine by a cam, said cam having a broad continuous surface bringing the said air plenum into communication with said combustion chamber of said engine during the said exhaust and intake strokes of said engine piston, said nozzle and said conduit comprising the exhaust circuit of an ejector during the upward exhaust stroke of said engine piston, and on the alternate downward stroke of said engine piston during the intake cycle flow passing through said nozzle and said conduit is reversed and said nozzle and said conduit become the intake air circuit of said ejector, a fuel injection cup mounted in said ejector exhaust circuit and said air circuit, a fuel injector for injecting fuel into said fuel injection cup through an injection conduit, said nozzle being axially aligned with the inlet of a diffuser, said inlet of said diffuser in communication with said air plenum and the outlet of said diffuser in communication with an exhaust pipe, said nozzle and said inlet of said diffuser comprising the elements of an ejector, said outlet of said diffuser and said exhaust pipe comprising the elements of a jet, said ejector and said jet work in tandem maintaining flow through said diffuser, a valve body fixedly mounted on said air plenum, said valve body having a pivotally mounted gate, said gate directing air from the inlet of said valve body proportioning said air between the inlet of said air plenum and the inlet of said exhaust pipe, said gate pivotally positioned by an actuator responding to electrical input signals from an engine control monitor, said engine control monitor adjusting air flow proportionally between said inlet of said air plenum and said inlet of said exhaust pipe in response to said electrical signals from said engine throttle positioning input circuit and fuel injection rate.

4. The engine of claim 2 in which said engine control monitor receives electrical input signals from a pressure sensor mounted in said air plenum, from an exhaust product sensor mounted in said exhaust pipe, and from a temperature sensor mounted in said combustion chamber of said engine, said electrical input signals from said sensors complement electrical signals from said throttle positioning input circuit.

* * * * *